United States Patent
Ennis (10) Patent No.: US 7,353,086 B2
(45) Date of Patent: Apr. 1, 2008

(54) METHODS AND SYSTEMS FOR PROVIDING A REARWARD FIELD OF VIEW FOR USE WITH MOTORCYCLES

(76) Inventor: Timothy James Ennis, 14337 20th Ave. NE., Seattle, WA (US) 98125

( * ) Notice: Subject to any disclaimer, the term of this patent is extended or adjusted under 35 U.S.C. 154(b) by 484 days.

(21) Appl. No.: 10/715,698

(22) Filed: Nov. 18, 2003

(65) Prior Publication Data

US 2004/0143373 A1  Jul. 22, 2004

Related U.S. Application Data (60) Provisional application No. 60/427,786, filed on Nov. 19, 2002.

(51) Int. Cl.
*G06F 17/00* (2006.01)
*H04N 7/00* (2006.01)

(52) U.S. Cl. .................. 701/1; 348/148; 348/115; 340/937; 359/550

(58) Field of Classification Search ............ 348/115; 340/937; 701/1; 359/550
See application file for complete search history.

(56) References Cited

U.S. PATENT DOCUMENTS

| | | | |
|---|---|---|---|
| 3,689,695 A | 9/1972 | Rosenfield et al. | 178/7.81 |
| 5,027,200 A | 6/1991 | Petrossian et al. | 358/103 |
| 5,121,200 A * | 6/1992 | Choi | 348/148 |
| 5,243,417 A | 9/1993 | Pollard | 358/103 |
| 5,517,196 A | 5/1996 | Pakett et al. | 342/70 |
| 5,537,110 A | 7/1996 | Iida et al. | 340/942 |
| 5,574,443 A * | 11/1996 | Hsieh | 340/901 |
| 5,670,935 A | 9/1997 | Schofield et al. | 340/461 |
| 5,680,123 A * | 10/1997 | Lee | 340/937 |
| 5,949,331 A | 9/1999 | Schofield et al. | 340/461 |
| 5,979,586 A | 11/1999 | Farmer et al. | |
| 6,046,766 A * | 4/2000 | Sakata | 348/148 |
| 6,111,498 A * | 8/2000 | Jobes et al. | 340/438 |
| 6,115,651 A * | 9/2000 | Cruz | 701/1 |
| 6,150,930 A | 11/2000 | Cooper | 340/435 |
| 6,154,703 A | 11/2000 | Nakai et al. | 701/200 |
| 6,175,300 B1 * | 1/2001 | Kendrick | 340/436 |
| 6,184,781 B1 | 2/2001 | Ramakesavan | 340/435 |
| 6,201,642 B1 * | 3/2001 | Bos | 359/565 |
| 6,212,468 B1 | 4/2001 | Nakayama et al. | |
| 6,222,447 B1 | 4/2001 | Schofield et al. | 340/461 |
| 6,268,804 B1 | 7/2001 | Janky et al. | 340/903 |
| 6,333,759 B1 | 12/2001 | Mazzilli | 348/148 |
| 6,357,882 B1 | 3/2002 | Whittingdale | |

(Continued)

*Primary Examiner*—Thomas Black
*Assistant Examiner*—Wae Lenny Louie
(74) *Attorney, Agent, or Firm*—Woodcock Washburn LLP (57) ABSTRACT

The present invention provides a system and method for using a camera and display screen to provide a vehicle operator with an image of all or part of the area surrounding the vehicle. A camera is attached to the vehicle that is in communication with a display screen viewable by the operator. A system for inverting the image from the camera makes the image more readily understandable to the operator when the operator is looking forward and the camera is pointed backward. The camera and display screen may be wired into a vehicle network. The network may comprise many other devices for added convenience and functionality. Many other advantages can be added to the basic system, for example an operator controlled zoom, automatic changes of camera angle, quick-release components, magnetic security keys, and the like.

22 Claims, 6 Drawing Sheets

U.S. PATENT DOCUMENTS

| | | |
|---|---|---|
| 6,363,326 B1 | 3/2002 | Scully ................... 701/301 |
| 6,389,339 B1 | 5/2002 | Just |
| 6,396,394 B1 * | 5/2002 | Suzuki et al. ............ 340/425.5 |
| 6,411,867 B1 * | 6/2002 | Sakiyama et al. ............. 701/1 |
| 6,411,901 B1 | 6/2002 | Hiwatashi et al. |
| 6,424,272 B1 | 7/2002 | Gutta et al. ................. 340/937 |
| 6,424,273 B1 | 7/2002 | Gutta et al. ................. 340/937 |
| 6,434,256 B1 | 8/2002 | Yeo |
| 6,476,731 B1 * | 11/2002 | Miki et al. .................. 340/937 |
| 6,593,960 B1 | 7/2003 | Sugimoto et al. ........... 348/148 |
| 6,693,519 B2 * | 2/2004 | Keirstead ................... 340/435 |
| 6,704,653 B2 * | 3/2004 | Kuriya et al. ............... 701/301 |
| 6,813,371 B2 * | 11/2004 | Kakinami .................. 382/104 |
| 6,850,252 B1 | 2/2005 | Hoffberg .................... 345/716 |
| 6,999,602 B2 * | 2/2006 | Yoshida et al. ............. 382/104 |
| 7,030,778 B2 * | 4/2006 | Ra ............................. 340/937 |
| 7,043,346 B2 * | 5/2006 | Kubota et al. ................ 701/28 |
| 7,111,968 B2 * | 9/2006 | Bauer et al. ................ 362/503 |
| 2002/0010655 A1 | 1/2002 | Kjallstrom |
| 2002/0041442 A1 | 4/2002 | Witt |
| 2002/0080018 A1 | 6/2002 | Yamazaki |
| 2002/0115454 A1 | 8/2002 | Hardacker |
| 2002/0123834 A1 | 9/2002 | Ogaki |
| 2002/0179853 A1 | 12/2002 | Olson |
| 2003/0137586 A1 * | 7/2003 | Lewellen ................... 348/148 |
| 2003/0202096 A1 * | 10/2003 | Kim .......................... 348/148 |

\* cited by examiner

Display Screen 112

METHODS AND SYSTEMS FOR PROVIDING A REARWARD FIELD OF VIEW FOR USE WITH MOTORCYCLES

CROSS-REFERENCE TO RELATED APPLICATIONS

This application claims benefit of U.S. Provisional Application No. 60/427,786, filed Nov. 19, 2002.

FIELD OF THE INVENTION

The following disclosure relates generally to methods and systems for providing a field of view to vehicle operators and, more particularly, to methods and systems for providing a rearward field of view to operators of motorcycles and other vehicles.

BACKGROUND OF THE INVENTION

Safe vehicle operation on public roads generally requires the vehicle operator to be fully aware of his or her surroundings. In addition to forward vision, the operator should also be aware of activity behind him or her. For example, if the operator desires to change lanes, then rearward vision is necessary to confirm that there are no overtaking vehicles in the desired lane. Rearward vision can also be useful to alert the operator as to vehicles wishing to pass, such as overtaking emergency vehicles.

Motorcycle riders generally rely on two common methods of providing rearward vision. The first method involves the use of mirrors which typically extend outwardly from a forward portion of the motorcycle, such as the handlebars or fairing. One shortcoming associated with this approach, however, is that the mirror may vibrate considerably at highway speeds resulting in a blurred or otherwise deceptive image. Another shortcoming associated with motorcycle mirrors is that they typically provide only a limited field of view, and may have blind spots in critical areas. A further disadvantage of motorcycle mirrors is that they may be positioned well to the side of the rider's forward field of view, or, conversely, positioned inward such that the view is obstructed by the rider's arms, shoulders, or a passenger. This requires the driver to momentarily take his or her eyes off the road and look over his/her shoulder.

A second method of providing rearward vision is for the operator to simply turn and look over his or her shoulder. While often necessary and efficient, this approach also suffers the drawback of requiring the operator to momentarily take his or her eyes off of the road ahead. In addition, this method has the further drawback of requiring the operator to turn his upper torso and rotate his shoulders rearward. This bodyweight shift can upset the balance of the motorcycle and cause it to momentarily move off of a desired line of travel.

There is at least one known system for use with a motorcycle that includes a display screen positionable on a forward portion of the motorcycle and a camera directed rearward from the motorcycle. This system is called the "cyclemirrorcam," and is manufactured and/or sold by Ranquel Engineering, Inc., of 3701 Alcantara Avenue, Miami, Fla. 33178. The cyclemirrorcam is, apparently, capable of displaying a rearward image on the display screen while the motorcycle is underway. The cyclemirrorcam product, however, has a number of shortcomings. For example, the image provided on the display screen may lack an adequate depth of field. Further shortcomings may include the inability to adjust for changes in ambient lighting (creating problems at night), and the sensitivity of the product to water.

SUMMARY OF THE INVENTION

The present invention provides a system and method for using a camera and display screen to provide a vehicle operator with an image of all or part of the area surrounding the vehicle. A camera is attached to the vehicle that is in communication with a display screen viewable by the operator. A system for inverting the image from the camera makes the image more readily understandable to the operator when the operator is looking forward and the camera is pointed backward. The camera and display screen may be wired into a vehicle network. The network may comprise many other devices for added convenience and functionality. Many other advantages can be added to the basic system, for example an operator controlled zoom, automatic changes of camera angle, quick-release components, magnetic security keys, and the like.

DETAILED DESCRIPTION OF ILLUSTRATIVE EMBODIMENTS

The following disclosure describes methods and systems for providing, broadening or enhancing a field of view, such as a rearward field of view, for use with a vehicle, such as a motorcycle. Certain specific details are set forth in the following description and in FIGS. 1-4 to provide a thorough understanding of various embodiments of the invention. Certain well-known details often associated with vehicles and/or display systems are not set forth in the following disclosure, however, to avoid unnecessarily obscuring the various embodiments of the invention. Further, those of ordinary skill in the relevant art will understand that they can practice other embodiments of the invention without several of the details described below.

In the drawings, identical reference numbers identify identical or at least generally similar elements. To facilitate the discussion of any particular element, the most significant digit or digits of any reference number refer to the figure in which that element is first introduced. For example, element 110 is first introduced and discussed with reference to FIG. 1.

Figure 1:
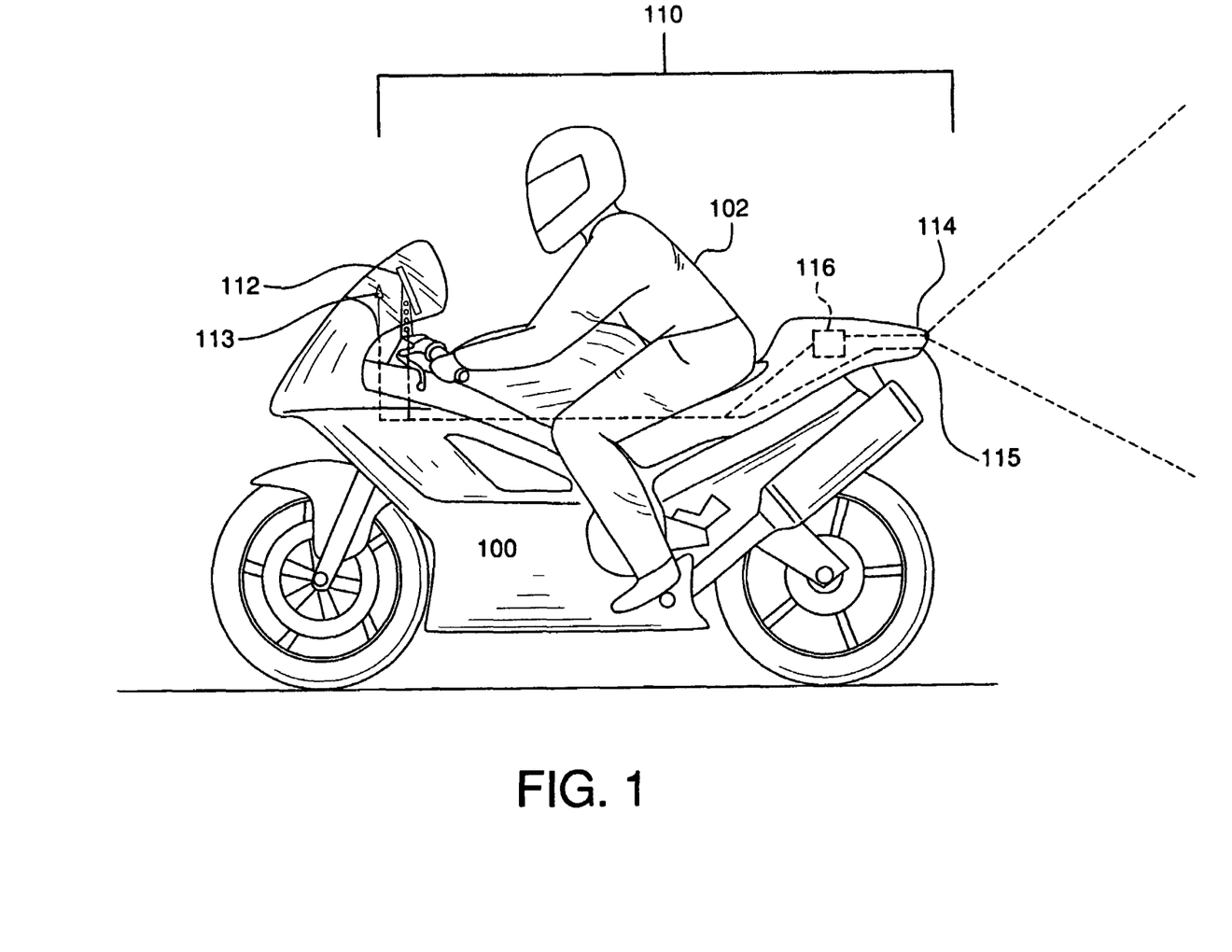
FIG. 1 is a side-elevation view of a motorcycle having a rearward vision system configured in accordance with an embodiment of the invention.

FIG. 1 is a side elevation view of a vehicle 100 having a rearward vision system 110 configured in accordance with an embodiment of the invention. For purposes of illustration, the vehicle 100 of the illustrated embodiment is a motorized vehicle, namely a motorcycle. The reader will readily appreciate, however, that the rearward vision system 110 is equally suited for use with a wide variety of other vehicles, including other motorized vehicles, such as cars and trucks, watercraft, aircraft, snow mobiles, and other non-motorized vehicles, such as bicycles, etc.

In one aspect of this embodiment, the rearward vision system 110 includes a camera 114 or cameras, an image inverter 116, and a display screen 112. The camera 114 can be a VC-54KDN high resolution color camera from SPY-CAMERAS.COM® suitable for day and night use. In other embodiments, other types of cameras can be used. Further, in other embodiments, pan, roll and pitch style cameras can be used in combination with the camera 114 to provide multiple viewing angles and perspectives. The camera 114 can be directed aft relative to the motorcycle 100 and can be operably connected to the image inverter 116. The image inverter 116 can invert the image viewed by the camera 114 and transmit the inverted image to the display screen 112. The display screen 112 can be positioned at least proximate to a forward portion of the motorcycle 100 in a forward field of view of an operator or rider 102. The display screen 112 can be a MARSHAL ELECTRONICS® 2.5" active matrix TFT LCD display, part number V-LCD2.5-P02. In other embodiments, other displays, such as other liquid crystal displays (LCD) can be used.

In another aspect of this embodiment, the rearward vision system 110 can provide the rider 102 with a rearward field of view relative to the motorcycle 100 without requiring the rider to rely on a rearview mirror or to turn his or her upper body and look over a shoulder. The rearward field of view offered by the rearward vision system 110 can include a number of features to enhance the rearward view of the rider 102. For example, the display screen 112 can be suitably mounted to isolate the vibration and provide a clear image of the activity aft of the motorcycle 100. Further, the image inverter 116 can invert the image viewed by the camera 114 to provide the rider 102 with a view on the display 112 that is flip-flopped like the view in a rearview mirror. As will be explained in greater detail below, the rearward vision system 110 can also include zoom capability and night illumination capability. The zoom capability can enable the rider 102 to adjust the depth of field of the camera 114. The night illumination capability can provide the rider 102 with an aftward field of view even in the absence of ambient lighting.

In addition to the foregoing, in a further aspect of this embodiment, the rearward vision system 110 can include one or more microphones or receivers 115. The microphone 115 can be operably connected to a speaker 113 positioned at least proximate to the display screen 112. Accordingly, the speaker 113 can provide the rider 102 with audio from aft of the motorcycle 100 in conjunction with the video images provided by the display screen 112.

Figure 2:
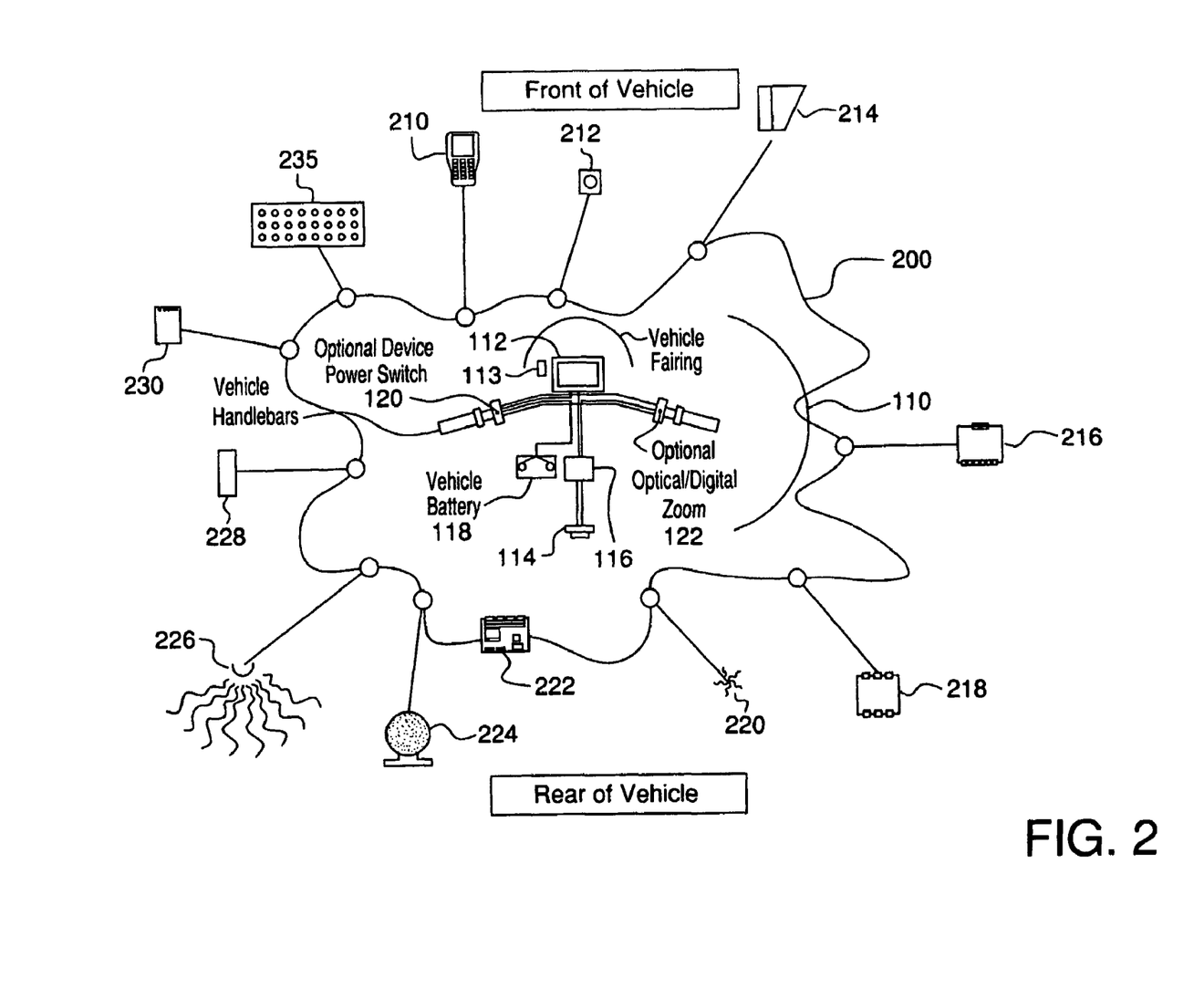
FIG. 2 is a schematic diagram of a vehicle information/communication network configured in accordance with an embodiment of the invention.

FIG. 2 is a schematic diagram of a vehicle information/communication network 200 configured in accordance with an embodiment of the invention. In one aspect of this embodiment, the vehicle information/communication network 200 ("network 200") includes the rearward vision system 110 described above with reference to FIG. 1. In addition to the components described above with reference to FIG. 1, the rearward vision system 110 can further include a system power switch 120 and a system zoom switch 122. The system power switch 120 can be any of a wide variety of devices used to control the flow of electricity to electronic devices, including but not limited to a standard switch, a magnetic switch with a magnetic key or a finger print recognition switch that may be uniquely encoded for increased exclusivity of access to the system, and a standard key-operated switch. The system power switch 120 is operably coupled to a battery 118, and can be manipulated by the rider (not shown) to switch the rearward vision system 110 on and off as desired. The system zoom switch 122 can be operably connected to the camera(s) 114, and can be manipulated by the rider to adjust the size and/or magnification of the image captured by the camera(s) 114 and transmitted to the display screen 112. In addition, the rearward vision system 110 can also include additional operator controls for adjusting the perspective and/or line of sight of the camera 114 and any additional cameras. For example, system controls can be provided that select which image capture device is being displayed at any given time, while motion control of image capture device may also be adjusted dynamically.

Figure 4:
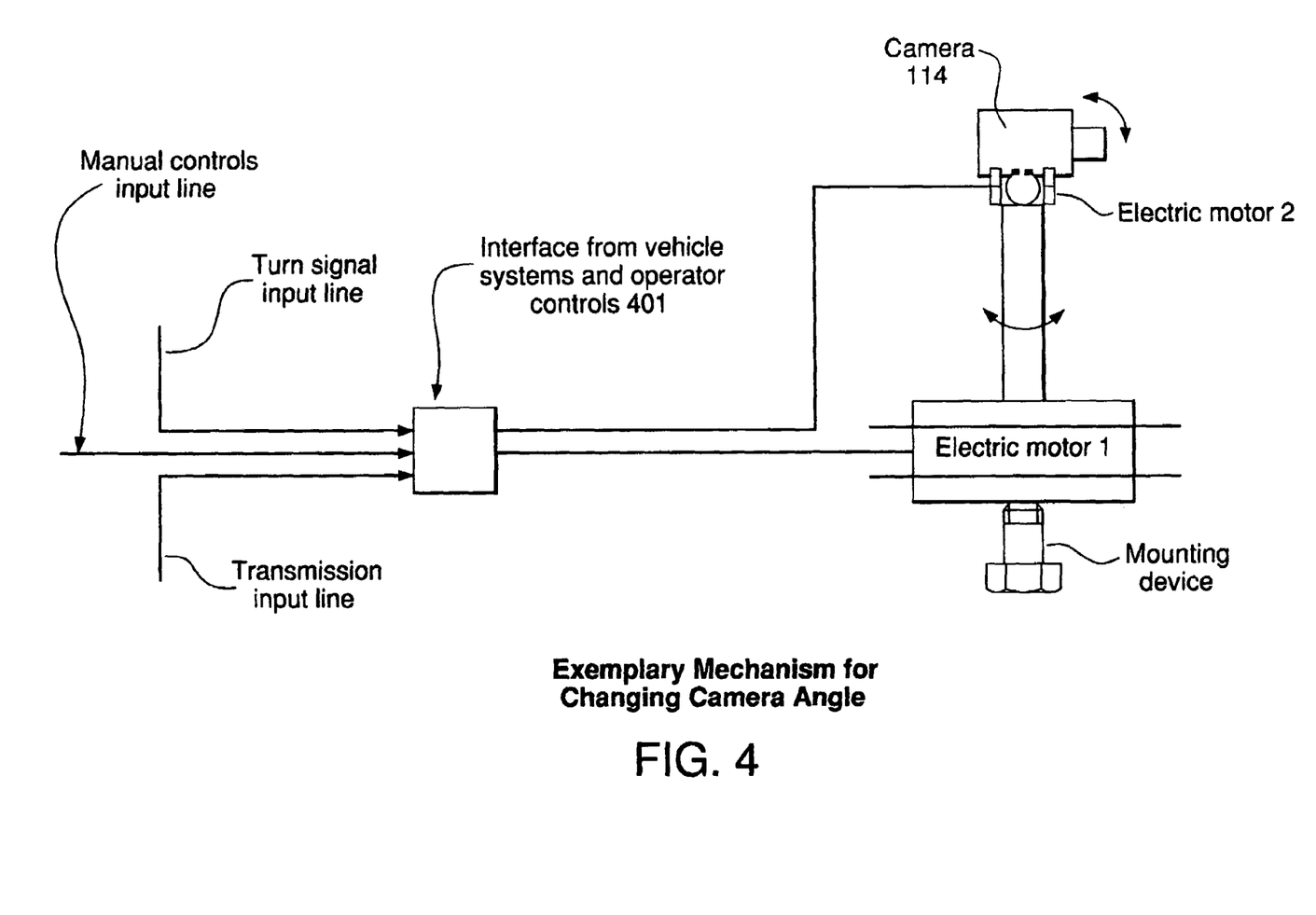
FIG. 4 is an exemplary system for changing the view angle of cameras mounted on a vehicle.

FIG. 4 is an illustration of an exemplary embodiment that provides operator 102 controls for changing the direction in which the camera(s) 114 is pointing. The camera 114 is attached to electric motor 1 and electric motor 2 which permit the camera 114 to change angle in both the vertical and horizontal planes. Those skilled in the art will readily see that the combination of electric motors shown in FIG. 4 is adaptable in many ways, allowing for a large variety of motor placements and types of motors which are capable of changing the horizontal and vertical camera angle. For example, either electric motor 1 or electric motor 2 could be replaced by hydraulic motion systems, piezo-electric motion systems, or any other device for imparting rotational motion to the camera 114. The camera 114 and electric motors 1 and 2 are attached to the vehicle (not shown) with a mounting device, which could be any number of possible mounts, including but not limited to a hitch mount for vehicles with tow hitches, a roof mount, or a rear-windshield mount which may use suction cups or other such devices to attach to glass. Electronic motors 1 and 2 are electronically coupled to an interface 401 that is optionally in communication with vehicle systems and vehicle operator controls. The interface 401 may contain the appropriate electronics to convert inputs from vehicle turn signals, vehicle transmission, operator controls or other sources into a change in camera 114 angle based on those inputs. For example, if the vehicle operator 102 activates his left turn signal, the interface would activate the electronic motors to provide an enhanced view for the contemplated maneuver. If the operator 102 places the transmission of the vehicle in reverse, the interface may activate the electronic motors to provide an enhanced view of the ground immediately behind the vehicle. Manual controls could be used to orient the camera 114 in the direction of the operator's choice. It is contemplated that the interface 401 may require a mechanism for prioritizing the various inputs and responding only to the highest priority input. For example, a manual input from the vehicle operator could override inputs from the turn signals and transmission. Conversely, the interface may combine the various inputs to determine an optimal camera angle based on some or all of the inputs. It is also contemplated that a package including the camera 114, electric motors 1 and 2, and the interface 401 may be made, providing a convenient box for sale and quick adaptation to the needs of various vehicle operators.

The network 200 can include a number of other components and/or features in conjunction with, or in addition to, the rearward vision system 110. For example, the network 200 can further include an infrared illuminator 224, a multiplexer 216, and a video splitter 218. The infrared illuminator 224 can be used to provide a visible image on the display screen 112 when the vehicle (not shown) is operated at night or in other conditions of low ambient lighting. The video splitter 218 can be utilized when two or more cameras are provided with the rearward vision system 110 providing two or more different images for display simultaneously on the display screen 112. These images can come from multiple positions or perspectives in addition to rearward perspectives. Cameras 114 could be mounted anywhere on a vehicle, including bumpers, windshields, vehicle undercarriages, or inside vehicle headlights or taillights. For example, this feature can enable omni-directional video/audio recording. Further, select camera positions may eliminate the need for image inversion, for example, a forward perspective camera(s) needs no inversion of the image. Accordingly, the image inverter may be eliminated in such applications.

In connection with the elimination of image inversion for some, but not all camera inputs to the display screen 112, additional electronics are required. This additional component may be embedded in the display screen 112 itself, or in the image inverter 116, or it may be provided by a separate component. An advantage of using the image inverter 116 or a separate component is that such a configuration allows the owner of the vehicle to utilize the optional inversion functionality in conjunction with any display screen 112. Those skilled in the art will recognize, however, that many hardware and software configurations might be used to provide optional image inversion for one or more camera inputs.

The simultaneous display of multiple images may be in the form of a split-screen, i.e., providing an image from each of a plurality of designated cameras in a portion of the display screen 112, or it may utilize "image stitching" to provide a single continuous image built from the various images captured by the cameras 114. Image stitching may alter the light and shadow of the image inputs to more evenly blend them together. Image stitching may or may not make use of the image inversion techniques described above. To provide better vehicle operator 102 comprehension of the stitched panoramic image, the display screen 112 for display of the stitched image may be curved, rather than flat, to symbolize the actual physical placement of the objects displayed. The curved or flat display screen 112 may optionally be implemented as a real-time panoramic rear-view mirror.

In a further aspect of this embodiment, the network 200 can also include a sun hood 214, a central processing unit (CPU) 222, and a personal digital assistant (PDA) 210. The sun hood or visor 214 can be positioned at least proximate to the display screen 112 to prevent glare and enhance visibility of the displayed images. The CPU 222 can be connected to one or more of the peripheral communication and/or information devices of the network 200 for processing analog and/or digital information received from the devices or for storing various data and other digital information on computer readable medium. The PDA 210 can be utilized in conjunction with one or more of the other components of the network 200 to, for example, access emails or perform various computations related to vehicle operation. In addition, the PDA 11 can function as an alternative image display source to the image display screen 112.

In yet another aspect of this embodiment, the network 200 can include a GPS sensor/antenna 220, a laser/radar transceiver 226, and a wireless image receiver 230. One or more of the foregoing devices can be operably connected to the display screen 112 and utilized by the vehicle operator to access information from one or more of these peripheral devices. For example, the laser/radar transceiver 226 can, in one embodiment, be used to measure distance and velocity of vehicles approaching, for example, from behind. In addition, the operator may utilize the display screen 112 to retrieve GPS positional data received via the GPS antenna 220. Further, the rider can utilize the display screen 112 to display wireless data, such as wireless image data from the camera 114, received via the wireless receiver(s) 230. The wireless receiver 230 may also support communications between any of the other devices on the network 200. The use of a wireless receiver may be especially valuable in large vehicles such as RVs and large trucks. A toggle switch 212, or other selection control such as a voice-activated selection system, may be operably connected to the network 200 can be utilized by the rider to optionally select from the different sources of information available from the various peripheral devices included in the network 200.

In addition to the foregoing, the network 200 can also include one or more data acquisition sensors 228 operably connected to the CPU 222 and/or the display screen 112. For example, the data acquisition sensor 228 can include one or more accelerometers which can transmit acceleration data to the CPU 222. The CPU 222 can, in one embodiment, use this data to calculate vehicle horsepower and/or other information and present this data on the display screen 112 for viewing by the operator 102.

A recording system 235 may be implemented in connection with one or more cameras 114 or as part of the network 200. The recording system 235 may attach locally at an individual camera 114, or elsewhere in the system. If the recording system 235 is attached such that it records the image displayed on the display screen 112, it could record the image as—inverted by the image inverter 116, or as toggled between multiple camera 112 inputs, some inverted and some not. The recording system 235 could also receive input from a camera mounted on a motorcycle operator's 102 helmet, so that it records everything the operator 102 looks at. It could be a stand alone recording system 235 that plugs into the vehicle network 200, or a recording system 235 permanently integrated into the network 200, which can transfer media via a smart card, or some other form of digital storage. It could be a remotely located recording system, that is in communication with the electronics of the camera 114 an/or vehicle network 200. Such a recording system may be useful both for vehicle operator 102 entertainment and for generating a record in case of motor vehicle accidents.

In a further aspect of this embodiment, one or more of the components described above with reference to FIG. 2 can be provided with "quick-disconnects" so that they may be quickly removed by the operator and carried with the operator while the vehicle is parked in, for example, a public place. Accordingly, this feature can be utilized to prevent theft of one or more of the components of the network 200.

Those of ordinary skill in the relevant art will appreciate that in other embodiments one or more of the foregoing components can be omitted or, alternatively, other components can be added to the network 200, without departing from the spirit and scope of the present invention. Further, the components described above can include other features and functions in addition to those described above in other embodiments.

Figure 3:
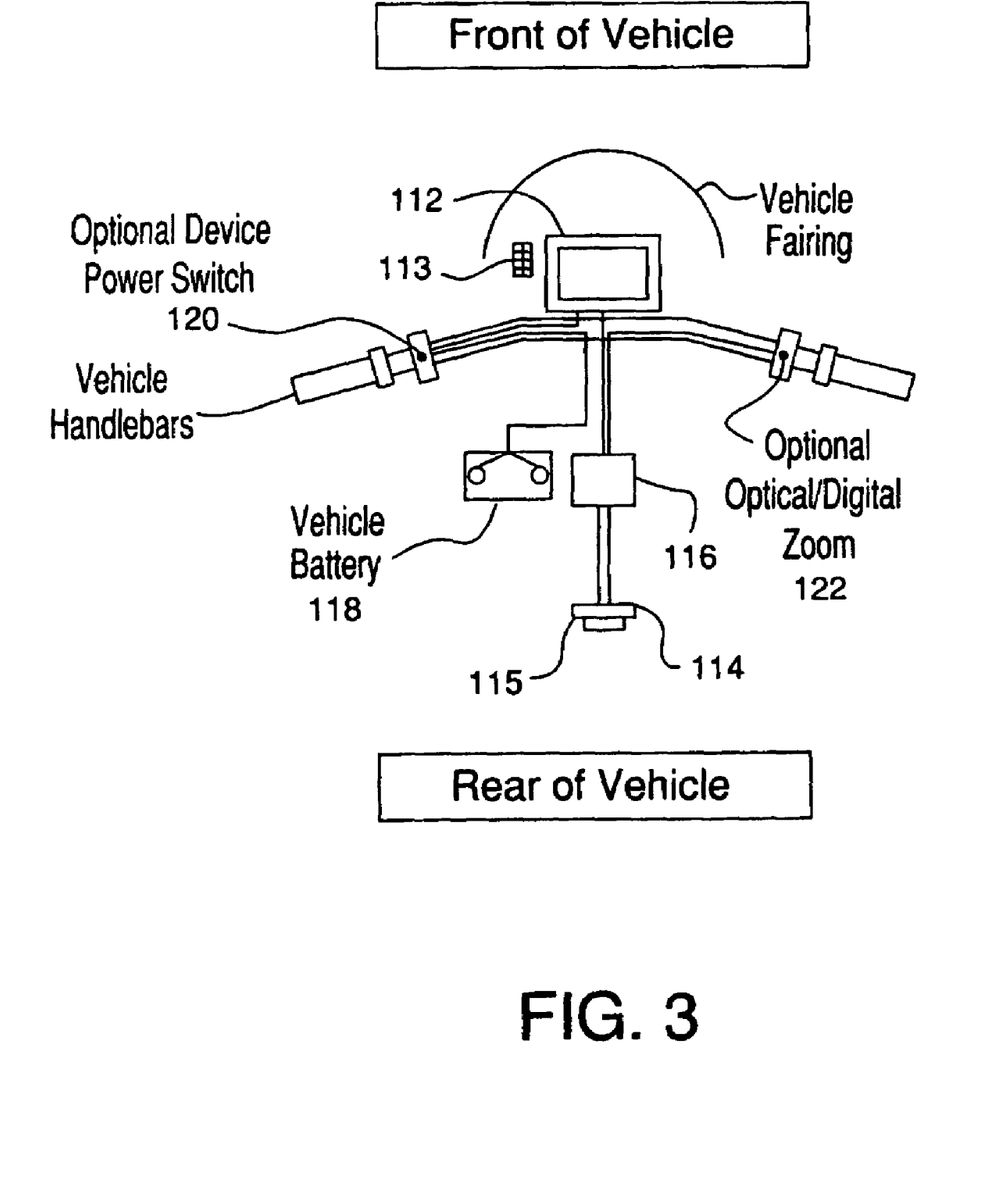
FIG. 3 is an enlarged schematic diagram of the rearward vision system of FIG. 2.

To further explore the advantages of the invention, refer to FIG. 3. In one embodiment the system includes three main electrical components: an image display component 112, an image capture component(s) 114, and an image inverter 116 capable of reversing an image taken by the aforementioned image capture component(s) 114. Additionally, these components can be combined using a variety of off-the-shelf hardware (i.e., wire of any various gauge and type, casings, switches, fuses, mounting devices, etc). The first embodiment can make use of the three primary components, and additional embodiments can include these three primary components. However additional embodiments may also utilize other components in any configuration, some of which are described below.

The operation of the invention can be illustrated with reference to FIG. 3. In one embodiment, the system includes the three primary components assembled on a vehicle in such a way that:

The image capture component(s) 114 can be mounted facing rearward of the operator.

The image capture component(s) 114 can transmit video and audio to the image inversion component 116.

The image inversion component 116 can then output this image to the image display component 112.

The image display component 112 can be placed in front of the user, incorporating a variety of mounting techniques that is at his/her discretion.

In one aspect of this embodiment, the system is designed to provide the motor vehicle operator with an adequate view of the surroundings behind the vehicle while it is in motion under all portions of a 24-hour day. The system can enhance the operator's ability to respond to the vehicular surroundings by enhancing visibility through the use of one or more image capture components 114, one or more image display components 112, one or more image inversion components 116, and all necessary cabling, switches, fuses, etc.

The applications of this system can be utilized for any type of motor vehicle operating on any surface solid, liquid, or gaseous. In addition, the system can be used in all weather/lighting conditions.

Components of the system can be encased in weatherproof materials that will allow for operation in all climates and conditions including: rain, sleet, hail, snow, sun, etc. "Weather proofing" can include silicone, rubber molding, ABS plastic, and metal casings, customized individually for each of the components.

In another embodiment, the system is capable of operating in a variety of lighting conditions including: no light, low light, rising sun, overhead sun, setting sun, light saturation, extreme bright light, head lights, nighttime, etc. This can be accomplished through the implementation of: a sun visor, or sun hood 214, an infrared illuminator 224 internal to the image capture component(s) 114, or an external device composed of a minimum of three infrared light emitting diodes 224. It may also be accomplished through treatment of the display screen 112 with various films and/or protective layers. One such treatment that permits increased visibility of display screens 112 in various weather conditions is the use of transflective films, an example of which is made by HORIZON TECHNOLOGY INC.® under model number LCDK-HT025PE. Another exemplary treatment provides increased visibility of the display screen 112 in the rain or when the display screen 112 is otherwise subjected to water or liquid. Such a film is known as rain diffuser film or hydrophilic film.

This is the description that the brochure reads about the film, "Original Hydrophilic film structure protects your field of vision in the rain by diffusing water droplets like a film. The photocatalytic self-cleaning effect and surface hardness provide it with outstanding durability."

As can also be readily understood with reference to FIG. 3, an embodiment of the invention may include an image display component 112 that can be an LCD provided by: WWW.MARS-CAM.COM® and can be a MARSHAL ELECTRONICS® 2.5" active matrix TFT LCD:

| Part number V-LCD2.5-PO2 | |
| --- | --- |
| Viewing Angle: | >10 degree |
| Image feature: | Mirror image function |
| Brightness: | 250+ candela brightness |
| Display: | 2.5" Active Matrix |
| Viewing Area: | 1.97 * 1.48 |
| Dot Pitch: | 0.105 mm × 0.161 mm |
| Back Light: | Edge Light |
| Color: | Full Color |
| Picture Element: | 480 H × 234 V |
| Supply Voltage: | 6-12 VDC, 400 mA |
| Size: | 2.42" W × 1.94" H × o.26" D |

In another aspect of this embodiment, the image capture component 114 can be a VC-54KDN color high resolution pinhole camera for day/night provided by SPYCAMERAS. COM®.

Color 380 TV lines of resolution, 470 TV lines enhanced.
542 H×496 V pixels
0.5 lux (LED sensitive)
525 lines f/s scanning system
Internal sine
S/N Ratio: 52 dB (min)/60 dB (TYP)
Shutter: $\frac{1}{60}$-$\frac{1}{120,000}$ sec
Mirror function
2× digital zoom function
ATW/AWB/FIX (zero color rolling)
AWB, ATW (3200-10000*K)/FIX (3200 *K) 12 DC, 85 mA
Dim: 1.26"×1.26"

Included Items:
2'cable (extendable w/standard RCA)
Regulated power adapter
3.8 mm conical pinhole lens (75 deg.)

In another embodiment, the best method for connections could be RCA or BNC cables and connectors, as well as conventional wire terminals and lugs for power connection.

All components can be quick-disconnect in practice, allowing the operator to carry any of the components with him/her for theft deterrence purposes. All cabling and connectors will stay hard mounted to the vehicle.

Figure 5:
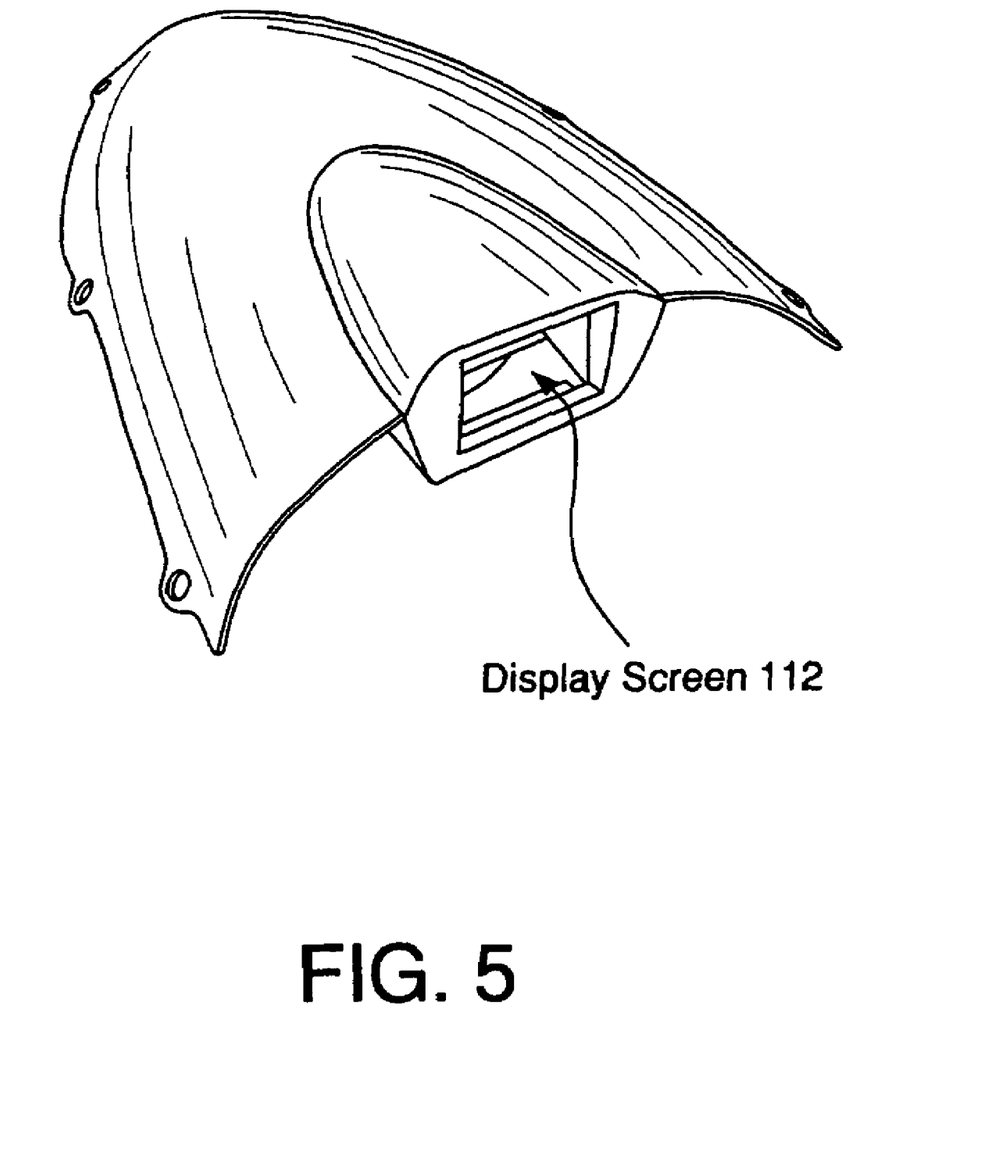
FIG. 5 is a picture of a windshield for a racing style motorcycle with a prefabricated mount for a display screen.
Figure 6:
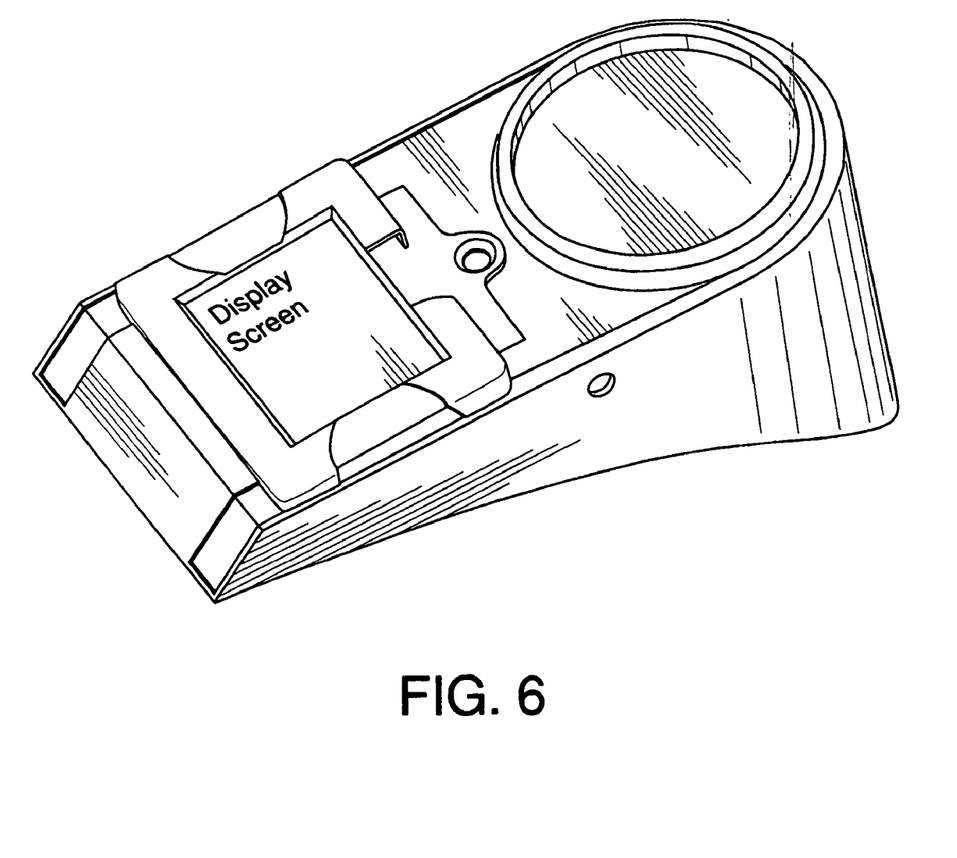
FIG. 6 is a picture of a gas tank attachment, of the type often seen on cruiser-style motorcycles, that can be adapted to mount a display screen.

The switches can include a momentary push button switch 212 mounted on the vehicle handlebars for additional capabilities (optional), and a system power switch 120 mounted inline with system wiring (optional). The system can include a switch for remote recording, pause, playback, battery life indication, input device switching, or input device zooming Mounting of various system components can include: a suction cup mounting for the image display component 112 or threaded post and nut configuration, Velcro mounting of the image capture component(s) 114, and positioning the image display component 112 under the windshield when present. In many racing style and high speed motorcycles, the windshield is not intended for the vehicle operator 102 to look through, but rather to direct the airflow over the rider at high speeds. The area underneath the windshield in such configurations provides one potential placement for a display screen 112, as can be readily understood with reference to FIG. 5, which provides a picture of a windshield pod unit for racing-style motorcycles. Another placement that may prove beneficial is on the gas tank of cruiser-style motorcycles, as can be readily understood with reference to FIG.

6, which depicts a standard gas tank attachment on cruiser-style motorcycles. In FIG. 6, the display screen 112 is positioned in an area that may generally be used, at present, for the ignition of the motorcycle. In this embodiment, the ignition apparatus may be moved to provide room for the display screen 112. Some display screen 112 placements may lend themselves to improved display screen 112 viewing when the display screen 112 is equipped with a mechanism allowing adjustment of the display screen 112 angle. The image display component 112 can also be mounted on handlebars when the windshield or gas tank is unavailable. In other embodiments, other mounting systems can be used to mount one or more of the system components.

Referring back to FIG. 2, another embodiment of the invention allows the image capture component(s) 114 to be replaced with an image capture component(s) 114 that has an incorporated 2× zoom feature or greater, which will allow users to capture multiple depths of field. This will allow the operator to optimize viewing under adverse conditions, and could be controlled by a push- button joystick or toggle switch 122.

In another embodiment, the image capture component(s) 114 can be replaced with an image capture component(s) 114 capable of a motorized tilt and panning function. This function would be controlled by the user via a joystick 212, or other user interface such as a voice activated control system.

In another embodiment, some or all of the components can be replaced with internal-battery operated components. Some or all of the system components may be powered with solar panels, fuel cells, or other energy storage or production technology.

In another embodiment, the image capture component(s) 114 can be replaced by a wireless image capture component(s) 114. The wireless component 230 can communicate directly with the display component via a receiver for the wireless signal. This embodiment may also include tilting, panning, or zooming in any configuration.

In another embodiment, multiple image capture component(s) 114 can be placed on the vehicle to display various images from any position on the vehicle. Those images can then be controlled by a multiplexer 216, which can by controlled by a toggle switch on the vehicle to allow the user to switch between image capture component(s) 114 angles. An additional view will allow all angles to be shown at one time on a split screen through the use of a video splitter 218.

In another embodiment, the image capture component(s) 114 will feed the signal to a central processing unit 222. The CPU 222 will then record audio and video in a removable storage device, while sending the video feed to the image display component 112 for vehicle operator viewing. A toggle switch 212 (or other user interface such as a voice recognition system) will allow the user control over when the recording feature is activated.

In another embodiment, the image display component 112 is replaced with a mounted docking station for a Personal Digital Assistant 210. A special software/hardware component can be added to the Personal Digital Assistant 210, which can allow the user to dock the PDA 210 and have it serve as the image display component 112.

In another embodiment, the image display component 112 can be a touch or voice activated device.

In another embodiment, the CPU 222 can be voice activated and communicate with all connected components.

In another embodiment, a Global Positioning Sensor/antenna 220 will be added to the vehicle. The user will be provided with a toggle switch 212 which will allow said user to switch between the image provided by the one of the image capture component(s) 114, and the Global Positioning Sensor/antenna's 220 graphically depicted data. Additionally, hardware and GPS software would be implemented to complete the system. Hardware will consist of either a Personal Digital Assistant 210 or a Central Processing Unit 222 system and related components.

In another embodiment, the image capture component(s) 114 can feed into a central processing unit 222 that can combine inputs from the vehicle such as: Speedometer, Tachometer, Odometer, etc. These inputs would be acquired using various data acquisition techniques and sensors 228. The combined inputs can be displayed on the same rearward image display component 112. This can be accomplished through the use of a reconfigurable display component with electronic segmentation for image data and acquired engine/operation output data.

In another embodiment, a laser/radar transceiver 226 will be attached to the rear of the vehicle, and face rearward. This component will use a laser/radar signal to determine the speed and distance of approaching traffic. This signal will be sent to a central processing unit 222, which will combine this data with the image taken from the image capture component(s) 114. The combined data will then be displayed on the image display component 112.

In another embodiment, the image display component 112 can be replaced with an image display component 112 that will carry features to adjust: color, black and white, blooming, smearing, sharpness, contrast, as well as any other adjustment that can be used to improve display quality.

In another embodiment, the Central Processing Unit 222 used for storage and data acquisition can also be interfaced with a vehicle network system 200. This system can be used for vehicle diagnostics, repair, upgrades, and general operator productivity and entertainment. This embodiment can operate in addition to supporting any and all features discussed in previous embodiments. The network 200 could be constructed using conventional networking protocols such as wireless 802.11b, BLUETOOTH®, ethernet, USB 2.0, or ETREWIRE®. Other communication protocols, such as token or bus ring topology protocols, are constantly developed and those skilled in the relevant art will recognize that these protocols may easily be adapted to serve the vehicle network 200. Fiber optics, coaxial cable, wireless systems, standard wire or any other means for transmitting a communications signal may be used, with the appropriate communications protocols, to construct the vehicle network 200.

In another embodiment, some or all of the previous embodiments can be put together in any combination to form an additional embodiment.

From the foregoing, it will be appreciated that specific embodiments of the invention have been described herein for purposes of illustration, but that various modifications may be made without deviating from the spirit and scope of the invention.

What is claimed:

1. A vision system for use with a motorcycle, comprising:
   a camera mountable to the motorcycle;
   an angle adjusting component for changing the angle of the camera mountable to the motorcycle;
   a display screen mountable above a gas tank of said motorcycle that displays an image from the camera mountable to the motorcycle;
   at least one of a suction cup, a threaded post, and an interlocking fabric for mounting the display screen above said gas tank; and a link between the turn signals of the motorcycle and the angle adjusting component for changing the angle of the camera mountable to the motorcycle, wherein activation of the turn signals of the motorcycle activates the angle adjusting component for changing the angle of the camera mountable to the motorcycle.

2. A vision system for use with a motorcycle, comprising:
a camera mountable to the motorcycle;
an angle adjusting component for changing the angle of the camera mountable to the motorcycle;
a display screen mountable above a gas tank of said motorcycle that displays an image from the camera mountable to the motorcycle;
at least one of a suction cup, a threaded post, and an interlocking fabric for mounting the display screen above said gas tank; and
a link between the transmission of the motorcycle and the angle adjusting component for changing the angle of the camera mountable to the motorcycle, wherein switching said transmission from one gear to another activates the angle adjusting component for changing the angle of the camera mountable to the motorcycle.

3. A display screen that provides an image to a motorcycle operator, comprising:
two or more cameras mountable to a motorcycle;
a display screen mountable above a gas tank of said motorcycle and viewable a motorcycle operator, wherein said display screen simultaneously displays to the motorcycle operator images from more than one of said two or more cameras mountable to said motorcycle, and wherein said images are stitched together to form a single continuous image;
at least one of a suction cup, a threaded post, and an interlocking fabric for mounting the display screen above said gas tank.

4. The vision system of claim 1, wherein the display screen mountable to the motorcycle is mountable underneath a substantially horizontal windshield.

5. The vision system of claim 1, further comprising a sun hood for shading the display screen mountable to the motorcycle.

6. The vision system of claim 1, further comprising a transflective layer on the display screen mountable to the motorcycle.

7. The vision system of claim 1, further comprising a water diffuser film on the display screen mountable to the motorcycle.

8. The vision system of claim 1, wherein the display screen mountable to the motorcycle is removable without the use of conventional tools.

9. The vision system of claim 1, wherein the display screen mountable to the motorcycle is a personal device that provides portable information to a carrier of said display screen mountable to the motorcycle.

10. The vision system of claim 1, further comprising infrared capability that allows for enhanced nighttime vision.

11. The vision system of claim 1, further comprising a zoom function that allows an operator of the motorcycle to adjust the magnification of objects displayed on the display screen mountable to the motorcycle.

12. The vision system of claim 1, further comprising an image adjust function that allows for adjustment of at least one of the contrast, the intensity, and the color of an image displayed on the display screen mountable to the motorcycle.

13. The vision system of claim 1, further comprising a splitter function that allows an operator of the motorcycle to split an image displayed on the display screen mountable to the motorcycle such that inputs from more than one camera are displayed simultaneously.

14. The vision system of claim 1, wherein said display screen mountable to the motorcycle is connected to an electronic vehicle network and is capable of providing information about the motorcycle to the motorcycle operator.

15. The vision system of claim 14, further comprising a Global Positioning System (GPS) that is attached to the vehicle network.

16. The vision system of claim 15, wherein said display screen displays GPS data supplied by said GPS.

17. The vision system of claim 15, wherein said GPS comprises a GPS antenna operably coupled to said electronic vehicle network.

18. The vision system of claim 14, further comprising a radar detection system that is attached to the vehicle network.

19. The vision system of claim 14, further comprising data acquisition sensors attached to the vehicle network for gathering information about the motorcycle.

20. The vision system of claim 1, further comprising a recording system for recording any images displayed on the display screen mountable to the motorcycle.

21. The vision system of claim 1, further comprising a lock and key system for turning the vision system power on.

22. The vision system of claim 1, further comprising a momentary change-function switch for temporarily changing an image displayed on the display screen mountable to the vehicle.

* * * * *